(12) United States Patent
Cho

(10) Patent No.: US 9,078,106 B2
(45) Date of Patent: Jul. 7, 2015

(54) METHOD FOR OFFERING LOCATION INFORMATION AND LOCATION INFORMATION PROVIDING SYSTEM

(75) Inventor: Jeonghoon Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 320 days.

(21) Appl. No.: 13/306,600

(22) Filed: Nov. 29, 2011

(65) Prior Publication Data

US 2012/0135758 A1  May 31, 2012

(30) Foreign Application Priority Data

Nov. 29, 2010 (KR) .................. 10-2010-0119973

(51) Int. Cl.
*H04Q 7/10* (2006.01)
*H04W 4/02* (2009.01)

(52) U.S. Cl.
CPC ..................... *H04W 4/028* (2013.01)

(58) Field of Classification Search
CPC ........ H04W 4/02; H04W 4/025; H04W 64/00
USPC .......... 455/456.1, 456.2, 456.3, 457
See application file for complete search history.

(56) References Cited

U.S. PATENT DOCUMENTS

| | | | |
|---|---|---|---|
| 7,742,774 B2 * | 6/2010 | Oh et al. ................. | 455/456.1 |
| 8,406,788 B2 * | 3/2013 | Khan ..................... | 455/456.1 |
| 2007/0178915 A1 | 8/2007 | Khan | |
| 2008/0171555 A1 | 7/2008 | Oh et al. | |
| 2009/0273659 A1* | 11/2009 | Lee et al. ............... | 348/14.02 |

FOREIGN PATENT DOCUMENTS

| | | |
|---|---|---|
| CN | 1421828 A | 6/2003 |
| JP | 10-341487 | 12/1998 |
| JP | 2001-289664 A | 10/2001 |
| JP | 2002-073621 A | 3/2002 |
| JP | 2005-184492 A | 7/2005 |
| JP | 2008-224520 A | 9/2008 |
| JP | 2010-63019 A | 3/2010 |
| KR | 10-2005-0039411 A | 4/2005 |

OTHER PUBLICATIONS

Office Action dated Dec. 7, 2011 in Korean Application No. 10-2010-0119973, filed Nov. 29, 2010.
Office Action dated Dec. 28, 2012 in Japanese Application No. 2011-257035, filed Nov. 25, 2011.
Office Action dated Dec. 19, 2013 in Chinese Application No. 2011-103866750.
Office Action dated Feb. 12, 2014 in Japanese Application No. 2011-257035.
Office Action dated Aug. 26, 2014 in Chinese Application No. 201110386675.0.

* cited by examiner

*Primary Examiner* — Ajit Patel
*Assistant Examiner* — Julio Perez
(74) *Attorney, Agent, or Firm* — Saliwanchik, Lloyd & Eisenschenk

(57) ABSTRACT

Disclosed herein is a location information providing method generating a map image in itself for a current position of a protectee terminal, when a protector terminal requests current position related information of a protectee terminal, in which the protectee terminal directly transmits the map image besides a picture image of a protectee terminal user to a protector terminal.

7 Claims, 3 Drawing Sheets

METHOD FOR OFFERING LOCATION INFORMATION AND LOCATION INFORMATION PROVIDING SYSTEM

CROSS-REFERENCE TO RELATED APPLICATION

This application claims the benefit under 35 U.S.C. §119 of Korean Application No. 10-2010-0119973, filed Nov. 29, 2010, which is hereby incorporated by reference in its entirety.

BACKGROUND OF THE DISCLOSURE

1. Field of the Disclosure

The present disclosure relates to a location information providing method, particularly to a location information providing method generating a map image in itself for a current position of a protectee terminal at a protectee terminal, when requesting current position related information of a protectee terminal from a protector terminal to the protectee terminal, in which the protectee terminal directly transmits the map image other than a picture image of a protectee terminal user to a protector terminal.

2. Description of the Related Art

A location based service (LBS) refers to a service providing various information related to positions by means of attaching chips connected to a base station or a global positioning system (GPS) such as a location tracking service, a public security service, and a location based information service. That is, a location based service is to provide several kinds of services based on location information obtained through a wired/wireless communication network.

Technical challenge solved by the present disclosure, is to provide a location information providing method generating a map image in itself for a current position of a protectee terminal at a protectee terminal, when a protector terminal requests information on a current position of a protectee terminal, in which the protectee terminal directly transmits the map image besides a picture image of a protectee terminal user to a protector terminal.

Another technical challenge solved by the present disclosure, is to provide a location information providing system generating a map image in itself for a current position of a protectee terminal at a protectee terminal, when a protector terminal requests information on a current position of a protectee terminal, in which the protectee terminal directly transmits the map image other than a picture image of a protectee terminal user to a protector terminal.

BRIEF SUMMARY

A location information providing method according to the present disclosure to achieve the technical challenges is performed between a protector terminal and a protectee terminal, having the steps of: (a) requesting positioning information services from the protector terminal to the protectee terminal; (b) generating a map image of a place where the protectee terminal is located responsive to the location information service request; and (c) adjusting the map image to a form suitable to display at the protector terminal, and directly transmitting the adjusted map image to the protector terminal.

A location information providing system according to the present disclosure to achieve said other technical challenges; transceives location information between at least two of wireless terminals, comprising a location based service server generating a map image corresponding to location coordinates; a first wireless terminal transmitting the location information service request requiring information related to a spot where a second wireless terminal is situated, and replaying the map image; and the second wireless terminal receiving the location coordinates from a man-made satellite responsive to the location information service request, and then delivering the location coordinates to the location based service server and receiving the map image to transmit it to the first wireless terminal.

The present disclosure is advantageous in that a protector terminal directly receives from a protectee terminal a map image of a spot where the protected terminal is placed and displays the same without going through a location information provision gateway server.

DETAILED DESCRIPTION

Figure 1:
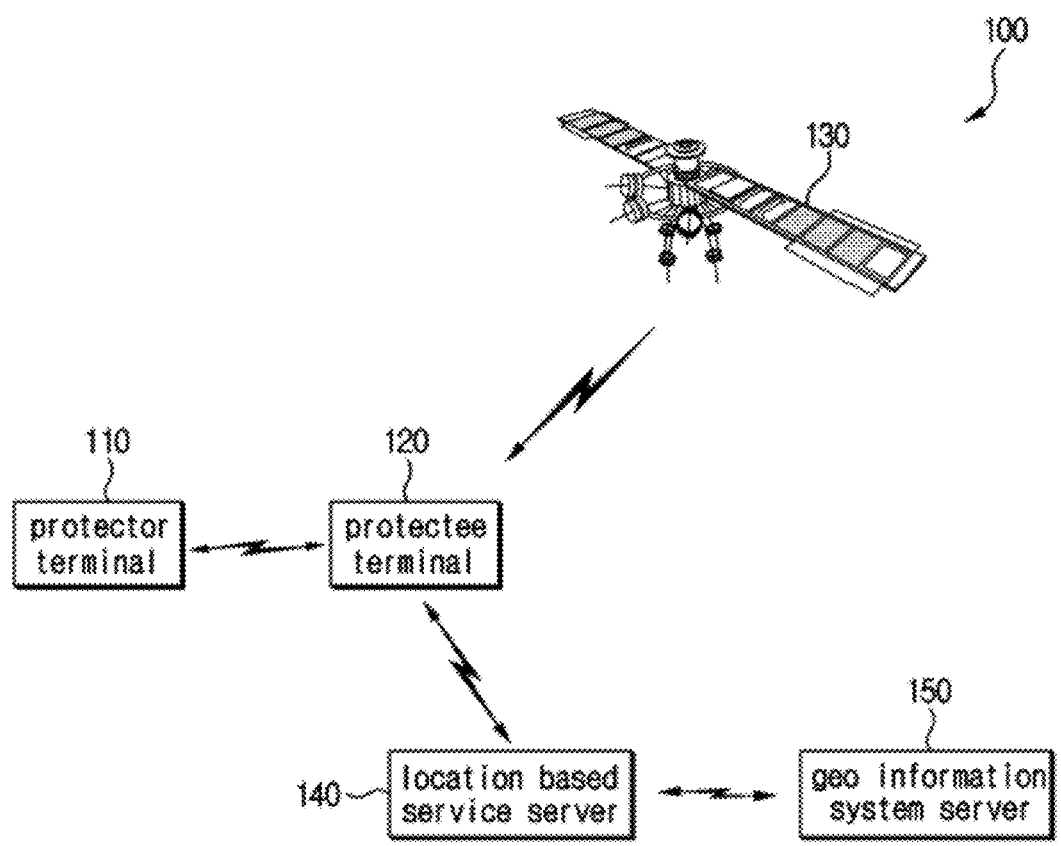
FIG. 1 indicates a location information providing system according to the disclosure.

So as to fully understand the present disclosure and benefits in an operation of the disclosure and objectives attained by practice of the present disclosure, reference will have to be made to the accompanying drawings and contents recited in said accompanying drawings of describing exemplary embodiments of the disclosure.

Hereinafter, by describing a preferred embodiment of the disclosure with reference to the accompanying drawings, the present disclosure is explained in detail. Same reference numerals presented in each drawing represents same members.

A core idea of the present disclosure is that when a protector terminal requests information on a current position of a protectee terminal, a map image on a current position of the protectee terminal is generated at the protectee terminal, and the protectee terminal directly delivers the map image besides a picture image of a protectee terminal user to a protector terminal.

In the prior art, a protector terminal would request location information of a protectee terminal not from a protectee terminal but from a location information providing gateway server using WIPI application. A location information providing server resent location information of a protectee terminal in a data packet to a protector terminal in response to the request.

Herein, WIPI (Wireless Internet Platform for Interoperability) is the name of a standard mobile platform in South Korea. This is established to lade a piece of content in service through several communication agents by standardizing a mobile platform between telecommunication companies. Prior to the introduction of WIPI, a mobile communication market of South Korea used to use a different platform for mobile communication companies, respectively. Since a variously different platform for each mobile communication company is used, each platform resultantly fails to be interchanged. To provide a program such as Games tailored to a platform of 'A' communication company for 'B' telecommunication firm, an enormous cost including additional investment of development-stage manpower is necessitated. Plus this, when a united platform is introduced, one-time developed program can be furnished through entire telecommunication companies, thus allowing development cost to be saved.

A gateway is a device acting as an inlet moving from one network to another network, which is used to connect one network such as a local area network (LAN) to another network. The reason why a gateway is needed is because a mode of transmitting data from one network to another network is different. Namely, each network transmits data using a protocol (a pre-defined contract as a data processing mode) differentiating from another network. In the case of directly connecting to a network using other protocols, data cannot be shared. Ordinarily, an electronic mail sent via internet can be viewed through a PC communication service, this is because a gateway exists relaying a communication internet and the network of PC communication service companies.

In current times, considering that a location information providing gateway server is not open to all users, but servicing only to a subscriber, a service capable of providing location information when desired to grasp a position of any terminal owner, even in a user that is not a subscriber, is required.

FIG. 1 indicates a location information providing system according to the disclosure. Referring to FIG. 1, a location information providing system 100 comprises a protector terminal 110, a protectee terminal 120, a man-made satellite 130, a location based service server 140, and a geographic information system server 150.

The protector terminal 110 transmits a location information service request to the protectee terminal 120 requiring information on a spot where the protectee terminal 120 is placed, and plays a map image and a picture image that has transmitted from the protectee terminal 120 on a display panel.

The protectee terminal 120 receives position coordinates from the man-made satellite 130, delivers position coordinates to the position based service server 140, and delivers the map image received from the location based service server 140 to the protector terminal 110 in response to the location information service request transmitted from the protector terminal 110.

The location based service server 140 delivers location coordinates received from the protectee terminal 120 to the geographic information system server 150, receives the map image from the geographic information system server 150, and delivers it to the protectee terminal 120.

The geographic information system server 150 generates the map image containing a region corresponding to location coordinates and a surrounding image of certain range, received from a location based service server 140, to deliver it to the location based service server 140.

Herein, a geographic information system (GIS) means a system employable to a topography related field such as transportation/communication by analyzing/processing a geographic space data. This refers to a comprehensive information system designed to make out/manage a map and geographic information previously utilized in a print-out form by using a computer, and based on geographic information obtained therefrom gather/analyze/process data to apply to all topology-related fields.

Figure 2:
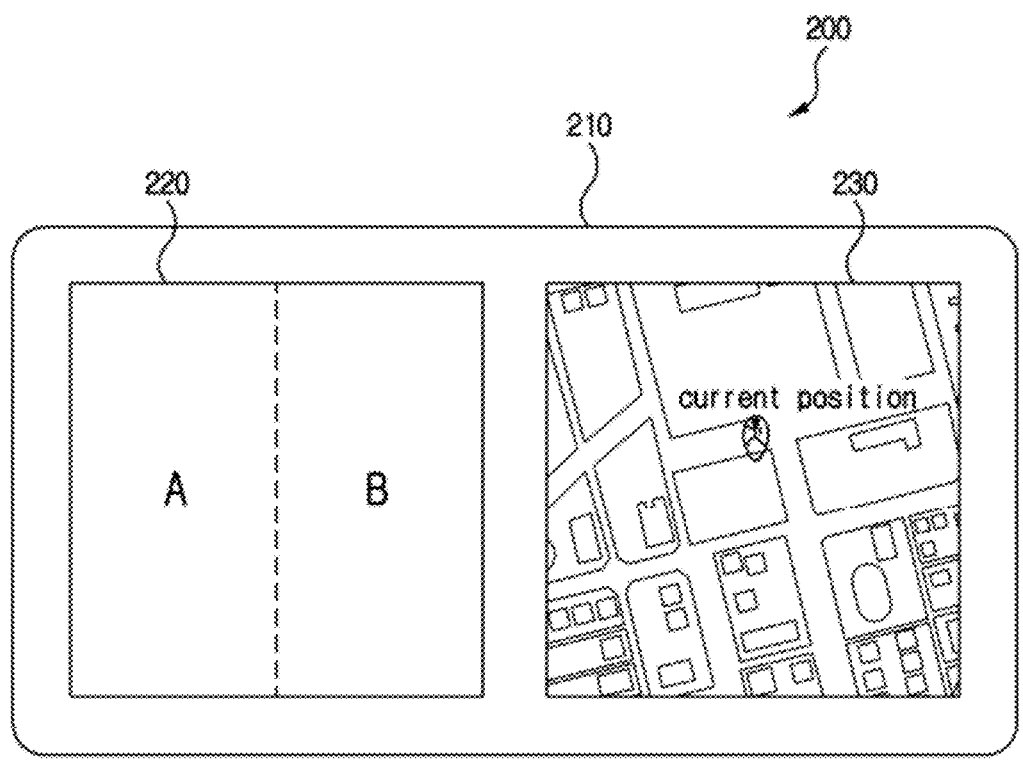
FIG. 2 is an example of a display panel of a protector terminal in the location information providing system according to the disclosure.

FIG. 2 is an example of a display panel of a protector terminal in a location information providing system according to the disclosure.

Referring to FIG. 2, a display panel 210 of a protector terminal 200 may be largely divided into two regions. A picture image display region 220 displays a facial picture image of video call parties, and a map image display region 230 displays a map image. The picture image display region 220 is again divided into two of sub regions A and B, and two of sub regions A and B display faces of 2 talkers, respectively.

The map image display region 230 displays the map image on the spot where the protectee terminal is placed.

A size of the map image may be adjusted according to a size of the display panel of the protectee terminal or to conditions of a base station. An adjustment of the map image is processed in any place of the geographic information system server 150, the location based service server 140, the protectee terminal 120 and the protector terminal 110.

In FIG. 2, the picture image and the map image are displayed dividing a display panel into two regions, but they may be superimposingly displayed. In this case, preferably, one image renders a main image and the other image is an additional image. Also, the picture image may include a face image of talkers as well as a surrounding image of the spot in which the talker is situated. In this case, a talker should be photographing the vicinity part automatically or manually right before video call or during the video call and putting a surrounding image in storage.

Figure 3:
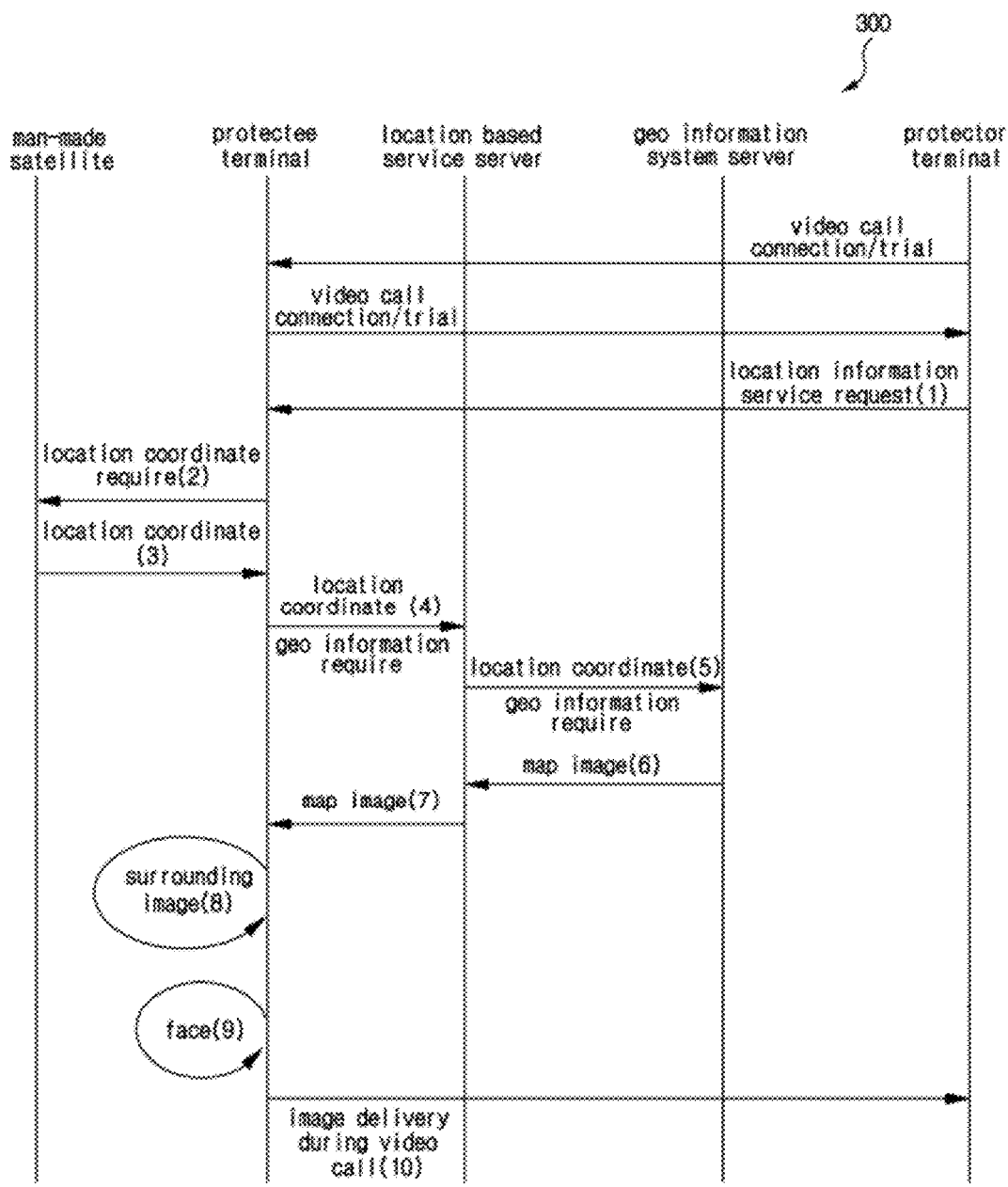
FIG. 3 indicates a signal flow diagram of a location information providing method according to the present disclosure.

FIG. 3 indicates a signal flow diagram of a location information providing method according to the disclosure.

In accordance with a location information providing method 300 according to the disclosure shown in FIG. 3, a general communication between a protector terminal and a protectee terminal is performed with a process that to a video call trial of one party, the other party connects a video call.

A signal flowing for location information service is performed as follows. The protector terminal requests location information service to the protectee terminal. (1) The protectee terminal, returning to the location information service request, receives location coordinates from a man-made satellite. (2, 3)

The protectee terminal delivers location coordinates received from the man-made satellite to a location based service server, whilst requiring map information. (4)

The location based service server delivers location coordinates received from the protectee terminal to a geographic information system server, whilst requesting map information. (5)

The geographic information system server generates a map image containing a location coordinate point and a periphery point of the indicated point using an atlas data base stored and location coordinates received from the location based service server, and delivers it to the location based service server. (6)

The location based service server delivers the map image received from the geographic information system server to the protectee terminal. (7).

The protectee terminal photographs its surrounding image and protectee's face. (8. 9) A protectee terminal performs a video call with a protector terminal, simultaneously delivering at least one of the map image, the surrounding image and facial images to the protector terminal. (10)

While technical spirits of the present disclosure has been described with the accompanying drawings in the above part, this exemplarily describes a preferred embodiment of the present disclosure and not limiting the disclosure. Also, to those skilled in the art, it would be clear that various modifications and imitations can be made without departing from the scope of the present disclosure.

What is claimed is:

1. A location information providing method between a request terminal and a target terminal, the method comprising:

connecting, by the target terminal or the request terminal, a video call with the request terminal;

receiving, by the target terminal, a request for location information of the target terminal while connecting the video call with the request terminal;

receiving, by the target terminal, location coordinates of the target terminal from a man-made satellite in response to the request for the location information;

transmitting, by the target terminal, the location coordinates to a location based service server;

receiving, by the target terminal, a map image of a place corresponding to the location coordinates from the location based service server;

transmitting the map image of the place where the target terminal is located to the request terminal while connecting the video call with the request terminal;

obtaining, by the target terminal, a surrounding image around the target terminal while connecting the video call with the request terminal;

obtaining, by the target terminal, a face image of a user of the target terminal; and transmitting by the target terminal, at least one of the thee image and the surrounding image to the request terminal, wherein the request terminal displays the map image in a half of a display of the request terminal, one of the face image and the surrounding image in a quarter of the display, and a face image of a user of the request terminal in the other quarter of the display.

2. The method of claim 1, wherein the map image of the place corresponding to the location coordinates is received from a geographic information system server by the location based service server.

3. The method of claim 1, wherein the surrounding image is obtained by the target terminal in response to the request for the location information of the target terminal.

4. The method of claim 1, wherein the surrounding image is obtained by the target terminal at predetermined intervals.

5. The method of claim 1, wherein the surrounding image is obtained by the target terminal when receiving a user's input for the photographing of the periphery.

6. A location information providing system transceiving location information between at least two wireless terminals, the system comprising:

a location based service server configured to generate a map image corresponding to location coordinates;

a first wireless terminal configured to:
 transmit a request for the location information while connecting with a second wireless terminal on a video call or while connected with the second wireless terminal on the video call, the location information relating to a place where the second wireless terminal is located; and
 display the map image while connecting with the second wireless terminal on the video call or while connected with the second wireless terminal on the video call; and the second wireless terminal configured to:
 receive a request for location information from the first wireless terminal while connecting the video call with the first wireless terminal or while connected with the first wireless terminal on the video call;
 receive the location coordinates of the second wireless terminal from a man-made satellite in response to the request for the location information;
 transmit the location coordinates to the location based service server;
 receive the map image of a place corresponding to the location coordinates from the location based service server;
 transmit the map image of the place where the second wireless terminal is located to the first wireless terminal while connecting the video call with the first wireless terminal or while connected with the first wireless terminal on the video call;
 obtain a surrounding image around the second wireless terminal while connecting the video call with the first wireless terminal;
 obtain a face image of a user of the second wireless terminal; and
 transmit at least one of the face image and the surrounding image to the first wireless terminal, wherein the first wireless terminal displays the map image in a half of a display of the first wireless terminal, one of the face image and the surrounding image in a quarter of the display, and a face image of a user of the first wireless terminal in the other quarter of the display.

7. The system of claim 6, further comprising:

a geographic information system server configured to generate the map image corresponding to the location coordinates, wherein the location based service server delivers the location coordinates to the geographic information system server to receive the map image.

* * * * *